United States Patent [19]

Feneberg

[11] 4,042,652
[45] Aug. 16, 1977

[54] METHOD FOR THE PRODUCTION OF SILICONE ELASTOMER-CONTAINING ARTICLES

[75] Inventor: Paul Feneberg, Planegg, Germany

[73] Assignee: AGFA-Gevaert, A.G., Leverkusen, Germany

[21] Appl. No.: 717,203

[22] Filed: Aug. 24, 1976

Related U.S. Application Data

[63] Continuation of Ser. No. 561,674, March 25, 1975, abandoned.

[30] Foreign Application Priority Data

Mar. 28, 1974  Germany .............................. 2414928

[51] Int. Cl.² .............................................. B29D 11/00
[52] U.S. Cl. .......................................... 264/1; 264/23; 264/101; 264/233; 264/234; 264/334; 264/343
[58] Field of Search ...................... 264/1, 23, 101, 102, 264/233, 234–236, 334, 336, 343

[56] References Cited

U.S. PATENT DOCUMENTS

| | | | |
|---|---|---|---|
| 3,350,216 | 10/1967 | McVannel | 264/1 |
| 3,361,858 | 1/1968 | Wichterle | 264/343 X |
| 3,542,907 | 11/1970 | Wichterle | 264/1 |
| 3,649,236 | 3/1972 | Rosenbauer | 264/1 X |

*Primary Examiner*—Thomas P. Pavelko
*Attorney, Agent, or Firm*—Michael J. Striker

[57] ABSTRACT

A method is disclosed which involves the production of shaped silicone elastomer-containing articles. In making an article of this type, a silicone elastomer-containing mass is formed to the desired configuration by subjecting it to pressure with a suitable die or pair of dies. Generally, the shaped mass will adhere to the die, or to one of the pair of dies, used for the shaping operation. A mechanical loosening of the shaped mass poses great difficulties. On the one hand, if sufficient caution is not excersied during loosening of the shaped mass, scratching or breakage of the latter will occur, particularly if the shaped mass is of small thickness. On the other hand, the exercise of great caution during loosening of the shaped mass is very time-consuming and, further, may still not yield satisfactory results if the shaped mass is of small thicnkess. In accordance with the invention, these problems are avoided in that the detachment of the shaped mass from the die to which it adheres is effected by contacting the shaped mass with a medium which impregnates the shaped mass so as to cause swelling of the latter. As a result, the shaped mass becomes loosened from the die without the danger of damage thereto. The medium may subsequently be removed from the shaped mass by heating and/or by the use of a vacuum. Suitable media for effecting detachment of the shaped mass from the die include the aliphatic, the aromatic and the halogenated hydrocarbons.

9 Claims, 3 Drawing Figures

METHOD FOR THE PRODUCTION OF SILICONE ELASTOMER-CONTAINING ARTICLES

This is a continuation of application Ser. No. 561,674, filed Mar. 25, 1975, and now abandoned.

BACKGROUND OF THE INVENTION

The invention relates generally to the production of silicone elastomer-containing articles. Of particular interest to the invention is the production of shaped articles.

The production of shaped silicone elastomer articles involves subjecting a mass of a silicone elastomer to pressure with one or more suitable dies. In this manner, a desired configuration is imparted to the silicone elastomer mass. Quite often, the shaped mass adheres to the die, or to one of the plurality of dies, used for the shaping operation.

The detachment of the shaped mass or article from the shaping die is currently effected by mechanical methods. Thus, the shaped article may be grasped with a pincer or tweezer and pulled from the die.

Thin-walled shaped articles, and especially those having thin edges such as, for instance, contact lenses composed of a silicon elastomer, are, however, frequently damaged or destroyed by the mechanical removal thereof from the die. Moreover, the mechanical detachment of the shaped article is relatively time-consuming by virtue of the care which must be exercised. These disadvantages become particulary evident in the mass production of such shaped articles.

Thus, it may be seen that improvements in the state of the art are desirable.

SUMMARY OF THE INVENTION

It is, accordingly, a general object of the invention to provide a novel method for the production of shaped articles.

Another object of the invention is to provide a method for the production of shaped silicone elastomer-containing articles which enables the danger of damage and destruction to be avoided with a greater degree of certainty than heretofore.

A further object of the invention is to provide a method for the production of shaped silicone elastomer-containing articles which enables a higher production than heretofore to be achieved.

An additional object of the invention is to provide a method for the production of shaped silicone elastomer-containing articles which is of greater simplicity than the prior art methods.

It is also an object of the invention to provide a method for the detachment of thin-walled shaped articles from shaping tools which enables damage to the articles to be avoided and which is well-suited for mass production.

These objects, as well as others which will become readily apparent as the description proceeds, are achieved in accordance with the invention. One aspect of the invention relates to a method of making silicone elastomer-containing articles by shaping a silicone elastomer-containing mass with at least one member to which the mass adheres subsequent to the shaping operation. In such a method, the invention provides for the improvement which comprises effecting the release of the mass from the member by contacting the mass with a medium which penetrates the mass so as to cause swelling of the latter and a resultant loosening of the mass from the member.

The medium with which the silicone elastomer-containing mass is contacted to effect release thereof from the shaping member any conveniently be referred to as a "swelling agent". However, the medium may also be designated by the term "solvent" although this does not necessarily imply that the silicone elastomer-containing mass undergoes some degree of dissolution in the medium but, rather, provides an indication of the nature of certain of the media which will be used in accordance with the invention. This will become clearer later on in the description. It may be mentioned, in this connection, that silicone elastomers and silicone rubber are normally not soluble in agents and that the destruction or disintegration thereof is usually effected by other means such as, for example, by heat.

The member which is used for shaping the silicone elastomer-containing mass may be any suitable shaping tool or die.

Subsequent to the release of the silicone elastomer-containing mass from the shaping tool, the swelling agent is favorably at least predominantly removed from the mass. The removal of the swelling agent from the mass may involve exposing the latter to an underpressure or vacuum. On the other hand, the removal of the swelling agent from the mass may involve heating the mass. Advantageously, the mass is heated and also exposed to an underpressure in order to remove the swelling agent therefrom.

In order to accelerate the release or detachment of the silicone-elastomer containing mass from the shaping tool, the mass may be subjected to the influence of ultrasonic waves during contact thereof with the swelling agent.

According to one embodiment of the invention, the mass is contacted with the swelling agent by immersing the shaping tool and the adhering silicone elastomer-containing mass in a bath of the swelling agent. It is favorable, in order to accelerate release of the mass from the shaping tool, when the mass is subjected to the influence of ultrasonic waves during such immersion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
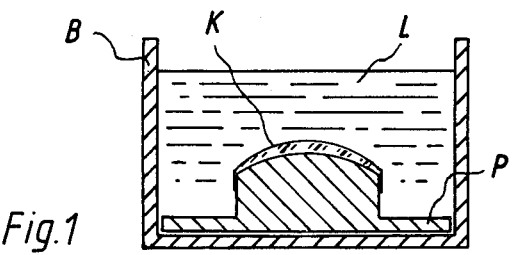
FIG. 1 schematically represents a shaping tool with an adherent shaped article immersed in a bath of a swelling agent.

As indicated previously, a particular interest of the invention relates to a method for the production of shaped silicone elastomer-containing articles. A special concern of the invention in this connection is a method for the detachment of silicone elastomer-containing articles from shaping dies or tools. The description which follows will, accordingly, be mainly within this scope.

According to one aspect of the invention, in a method for the production of shaped silicone elastomer-containing articles, a shaped article is caused to swell and to become loosened from the shaping tool by means of a swelling agent and the swelling agent is subsequently again removed from the shaped article. It is of advantage when the shaping tool and the adherent silicone elastomer-containing article are immersed in a bath of the swelling agent. Here, by appropriate choice of the swelling agent, the shaped article may float on the surface of the swelling agent after detachment from the shaping tool and may then be readily fished from the surface of the swelling agent bath. Suitable swelling agents which may be used in accordance with the invention will be indicated below.

It is particularly favorable for the swelling agent to be quantitatively removed from the shaped article.

As outlined above, one aspect of the invention provides for the detachment of a shaped article from a shaping tool by causing swelling of the shaped article using a swelling agent. However, as mentioned previously, the medium with which the shaped article is contacted to effect its release from the shaping tool may also be referred to as a solvent. It may be pointed out here that one reason for this resides in that, for the detachment of large articles from shaping tools, mechanical dissolution may occur. Although it is to be understood that the occurrence of at least some dissolution is not to be excluded from the scope of the invention, the description herein will nevertheless be primarily with reference to swelling only.

With respect to the materials which may be subjected to a treatment in accordance with the invention so as to effect their release from a shaping tool, the invention is particularly interested in the treatment of silicone elastomer-containing articles, that is, articles which comprise or consist essentially of a silicone elastomer. The term silicone elastomer as used herein will be understood to include silicone rubber. It will be appreciated, however, that the principles of the invention may, in principle, be applicable to other appropriate materials also.

To provide a better understanding of the invention, it is pointed out that, in the production of shaped silicone elastomer articles such as, for instance, contact lenses, by compression, working pressures of up to 100 atmospheres per square centimeter are utilized. As a result, the shaped articles become intimately bonded to the shaping tools. When using mechanical means, the shaped articles may be removed from the shaping tools only by exercising extreme caution. Further, the removal of the shaped articles from the shaping tools by such means requires a great expenditure of time.

Considering the production of a shaped silicone elastomer article by the compression of a mass of a silicone elastomer between a pair of shaping tools, e.g., dies, the two halves of the shaping arrangement may be separated subsequent to the shaping operation by tilting. The shaped article now adheres to one of the halves of the shaping arrangement, that is, to one of the shaping tools, and heretofore had to be removed therefrom by mechanical means. Here, it was first necessary to remove the material which had flowed over the edges of the shaped article into the interior of the shaping tool.

Thereafter, by carefully lifting the edges of the shaped article from the surface of the shaping tool, the shaped article was loosened at various locations and gradually lifted off the shaping tool. As mentioned earlier, the prior art utilizes pincers, tweezers or the like to remove a shaped article from a shaping tool.

Particular difficulties when using this method were encountered for contact lenses which, in general, have an edge thickness of no more than about 1/10 of a millimeter. Thus, in many instances, the formation of lasting impressions on such contact lenses by the utensil which is used to lift the same off the shaping tools, or the tearing and concomitant destruction of the contact lenses by such utensil, was impossible to avoid despite the exercise of the most extreme care. To further complicate matters, the destruction of the contact lenses during the operation of loosening the same from the shaping tools is also promoted by the fact that the silicone elastomer material constituting the contact lenses possesses only a low mechanical strength for a considerable period of time after the compression.

As pointed out previously, the invention enables these disadvantages to be overcome by making it unnecessary to mechanically loosen silicone elastomer-containing articles from shaping tools. Thus, in accordance with the invention, a shaped article may be detached from a shaping tool by contacting the shaped article with an agent which penetrates the latter and causes swelling thereof.

To further illustrate the invention, reference may be had to the drawing which indicates one manner of effecting detachment of a shaped article from a shaping tool. Referring first to FIG. 1, it is pointed out that the reference character B identifies a container. The container B accommodates a bath L of a swelling agent.

According to FIG. 1, in one aspect of the detachment procedure in accordance with the invention, a shaping tool P with a contact lens K adhering thereto is immersed in the bath L. The shaping tool P is here assumed to be one of a plurality, e.g., a pair, of shaping portions of a shaping arrangement and the contact lens K is here assumed to be composed of a silicone elastomer.

Figure 2:
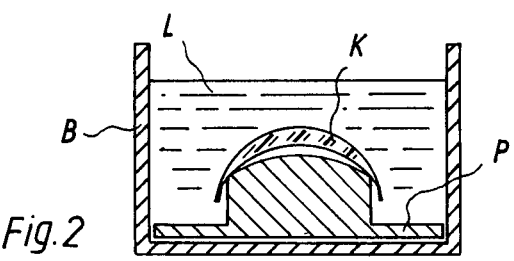
FIG. 2 is similar to FIG. 1 but illustrates the situation after a period of time has elapsed and the shaped article has begun to swell.

FIG. 2 illustrates the situation after the shaping tool P and the contact lens K have been immersed in the bath L for some period of time. Thus, in accordance with FIG. 2, the volume of the lens K begins to increase due to the influence of the swelling agent of the bath L on the lens K. Depending upon the choice of the swelling agent, volume increases of up to 250 percent may be achieved.

As a result of the increase in volume of the lens K, the latter becomes loosened from the shaping tool P. FIG. 2 depicts the lens K after it has become partially loosened from the shaping tool P.

Figure 3:
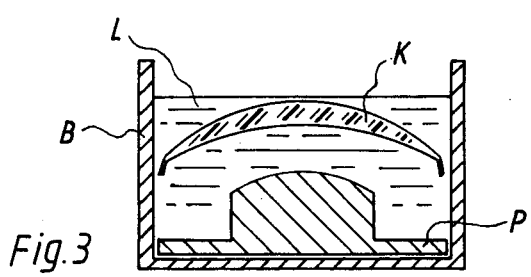
FIG. 3 is similar to FIGS. 1 and 2 but illustrates the situation at a later time when the shaped article has become detached from the shaping tool.

When the volume of the lens K has increased sufficiently, the lens K becomes completely detached from the shaping tool P. By appropriate choice of the swelling agent, the lens K may then be caused to float on or in the region of the surface of the bath L from where it may be readily fished off. This situation is illustrated in FIG. 3 which shows the simplicity with which the detached lens K may be recovered.

Generally, the contact lens K may be contacted with the swelling agent for a period between about 1 and 5 minutes in order to effect detachment thereof from the shaping tool P. However, the contact time depends upon the thickness of the contact lens K. Thus, a thin lens may become detached in approximately 1 to 3 minutes whereas a thick lens may require a contact time of approximately 4 to 5 minutes for detachment. It will be understood that the contact times presented here are only intended to provide a general indication of the time which is required for detachment of the lens K from the shaping tool P.

The contact lens K may be contacted with the swelling agent at temperatures between about $-90°$ and $+100°$ C. It will be appreciated that a contact temperature corresponding to room temperature may be convenient.

The rate of loosening of the lens K from the shaping tool P may be increased by the use of ultrasonic waves, that is, by subjecting the lens K to the influence of such waves. The lens K may be subjected to the influence of the ultrasonic waves in different ways. For example, the container B and the bath L of the swelling agent accommodated therein may be immersed in an ultrasonic bath for a short period of time. On the other hand, it is also possible for the container B to constitute part of an ultrasonic cleaning arrangement, which latter is known per se.

Subsequent to the detachment of the lens K from the shaping tool P, the swelling agent may be removed from the lens K. Advantageously, the swelling agent is quantitatively removed from the lens K. The reason is that harmful physiological reactions on the eyes which are provided with the contact lens K may otherwise occur. The removal of the swelling agent from the lens K is favorably effected by heating the lens K in a heating cabinet or the like while flushing with fresh air. Depending upon the temperature and the type of swelling agent used, the lens K may remain in the heating cabinet for a period of about 1 to several minutes.

Preferably, the temperatures used for removing the swelling agent from the contact lens K do not exceed about 200° C.

It is pointed out that, by placing the contact lens K in a closed oven and producing an underpressure or vacuum in the latter, it is likewise possible to achieve a quantitative removal of the swelling agent from the lens K. For this purpose, underpressures down to about $10^{-2}$ torr may be used. The underpressure which is actually used in a given instance may, at least to an extent, be dictated by economic considerations.

It is not absolutely necessary to heat the contact lens K in order to remove the swelling agent therefrom since swelling agents having relatively low boiling points, and which can thus evaporate at room temperature, may be used. However, although there exists a large number of swelling agents which have a very low boiling point and the evaporation of which may, accordingly, already occur at room temperature, it is nevertheless preferred to heat for the purpose of removing the swelling agent because of the higher purity of the contact lens K which may thus be achieved.

Due to the removal of the swelling agent from the contact lens K as described above, the contact lens K returns to its original form, that is, achieves its original configuration. Even after a hundred treatments of the lens K with suitable swelling agents, no measureable changes in the optical and mechanical parameters of the lens K occur.

The swelling agents used for the method in accordance with the invention are advantageously organic compounds. Particularly suitable substances include the aromatic hydrocarbons such as, for instance, benzine, xylene and benzene; the aliphatic hydrocarbons such as, for example, diethyl ether and ethyl acetate; and the halogenated hydrocarbons such as, for instance, carbon tetrachloride and trichloroethylene. With respect to the halogenated hydrocarbons, it may be mentioned that the fluorinated hydrocarbons are also particularly well-suited for use as swelling agents. Representative of the fluorinated hydrocarbons which may be used are the products available under the trade names Kaltron, Freon and Frigen which are similar in nature. Especially the last-mentioned substances are particularly well-adapted for use in accordance with the invention due to their inert characteristics, their favorable boiling points and their relative physiological harmlessness. It may be noted that the general nature of the foregoing substances provides another indication as to why the medium with which a lens is contacted to effect its release from a shaping tool according to the invention may be termed a solvent.

It is favorable, when using swelling agents of the type listed above, to direct particular attention to, and to lay great emphasis upon, the purity of the swelling agent. A purification of the commercial substance used as the swelling agent such as, for instance, by a distillation carried out under precisely controlled conditions, may be required in order to obtain good physiological compatibility of a silicone elastomer contact lens treated with the swelling agent. In this connection, it may be mentioned that treatment with a non-purified swelling agent may cause residues to remain on the contact lens.

Physiological experiments carried out with animals and humans have demonstrated the harmlessness, from a medicinal viewpoint, of the above-described method.

The following Example is intended to further illustrate the invention and is not intended to limit the same in any manner:

EXAMPLE

A die having a lens adhering thereto is placed in Kaltron MDR 113 (Manufacturer: Kalichemie Company of the German Federal Republic). The lens is composed of a silicone elastomer, namely, a polyorganodimethylsiloxane rubber. The Kaltron MDR 113 has been purified by distillation and the die and lens are placed therein at room temperature and remain therein for a period between 2 and 3 minutes. After this time, the swelling of the lens has proceeded to such a degree that the lens floats on the surface of the bath. Subsequent to careful removal of the lens from the bath, the lens is placed in an oven at a temperature of 170° C. The oven is flushed with fresh air and the lens remains in the oven for a period between 2 and 3 minutes. During this time, the mass of the lens returns to its original value. After the treatment of the lens in the oven has been completed, the lens is removed from the latter and transported from the oven for its further processing.

It will be understood that each of the elements described above, or two or more together, may also find a useful application in other types of procedures differing from the types described above.

While the invention has been illustrated and described as embodied in a method for the production of a silicone elastomer contact lens, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In the making of contact lenses the steps of shaping a silicone elastomer lens by means of a pressure-die comprising two complementary die members, the shaped lens at the end of the shaping step adhering to one of the die members, applying a swelling agent to the lens after shaping which agent is adapted to penetrate the silicone elastomer of the lens whereby the lens spontaneously separates from the said die member, thereafter removing the swelling agent from the lens so as to cause the lens to become deswollen to the shape it had adopted prior to application of said swelling agent and recovering the shaped lens.

2. The process of claim 1 wherein the swelling agent is a liquid medium and the lens is immersed in a bath of the swelling agent.

3. The process of claim 2 wherein the lens while in said bath is subjected to ultrasonic waves so as to accelerate the said separation of the lens from the die member.

4. The process of claim 1 wherein the removal of the swelling agent is accomplished by evaporation.

5. The process of claim 4 wherein the evaporation of the swelling agent is effected by the application of heat.

6. The process of claim 4 wherein the swelling agent is a highly purified fluorocarbon compound adapted to evaporate without leaving a residue.

7. The process of claim 6 wherein the swelling agent is applied to the lens for a time of 1 to 5 minutes.

8. The process of claim 4 wherein the evaporation is effected by applying heat to the lens while flushing it with fresh air.

9. The process of claim 1 wherein the removal of the swelling agent is effected by applying a vacuum to the lens.

* * * * *